US012155121B2

(12) United States Patent
Huang et al.

(10) Patent No.: US 12,155,121 B2
(45) Date of Patent: Nov. 26, 2024

(54) ULTRA WIDEBAND ISOLATION FOR COUPLING REDUCTION IN AN ANTENNA ARRAY

(71) Applicant: SWIFTLINK TECHNOLOGIES INC., Richmond (CA)

(72) Inventors: Min-Yu Huang, Richmond (CA); Abhijit Bhattacharya, Burnaby (CA)

(73) Assignee: SWIFTLINK TECHNOLOGIES INC., Richmond (CA)

( * ) Notice: Subject to any disclaimer, the term of this patent is extended or adjusted under 35 U.S.C. 154(b) by 0 days.

(21) Appl. No.: 17/666,223

(22) Filed: Feb. 7, 2022

(65) Prior Publication Data

US 2023/0253703 A1 Aug. 10, 2023

(51) Int. Cl.

*H01Q 5/25* (2015.01)
*H01Q 1/52* (2006.01)
*H01Q 21/06* (2006.01)

(52) U.S. Cl.

CPC ............... *H01Q 1/523* (2013.01); *H01Q 5/25* (2015.01); *H01Q 21/065* (2013.01)

(58) Field of Classification Search

CPC ......... H01Q 1/523; H01Q 5/25; H01Q 21/065
See application file for complete search history.

(56) References Cited

U.S. PATENT DOCUMENTS

| | | | | |
|---|---|---|---|---|
| 6,218,989 | B1 * | 4/2001 | Schneider | H01Q 1/523 343/700 MS |
| 7,498,997 | B2 * | 3/2009 | Moon | H01Q 1/523 343/834 |
| 7,830,301 | B2 * | 11/2010 | Margomenos | H01Q 21/065 343/700 R |
| 8,144,063 | B2 * | 3/2012 | Schlub | H01Q 9/0407 343/702 |
| 10,333,213 | B2 * | 6/2019 | Zolomy | H01Q 1/521 |
| 11,024,952 | B1 * | 6/2021 | Quarfoth | H01Q 1/364 |
| 11,081,807 | B2 * | 8/2021 | Jong | H01Q 1/243 |
| 2003/0164797 | A1 * | 9/2003 | Ngai | H01Q 1/523 343/700 MS |
| 2017/0194703 | A1 * | 7/2017 | Watson | H01Q 1/523 |
| 2017/0222315 | A1 * | 8/2017 | Hozouri | H04B 17/27 |
| 2019/0020100 | A1 * | 1/2019 | Jong | H01Q 1/48 |
| 2021/0391647 | A1 * | 12/2021 | Guo | H01Q 19/108 |
| 2022/0399634 | A1 * | 12/2022 | Woo | H01Q 1/521 |

FOREIGN PATENT DOCUMENTS

| | | | | |
|---|---|---|---|---|
| CN | 105576361 A | * | 5/2016 | H01Q 1/38 |
| CN | 108933331 A | * | 12/2018 | H01Q 1/38 |

OTHER PUBLICATIONS

Ghaderi et al, "Frequency Selective Surface for Reducing Mutual Coupling in Antenna Arrays", 2011, Proceedings of the Asia-Pacific Microwave Conference (Year: 2011).*

* cited by examiner

*Primary Examiner* — Dameon E Levi
*Assistant Examiner* — Anh N Ho
(74) *Attorney, Agent, or Firm* — WOMBLE BOND DICKINSON (US) LLP

(57) ABSTRACT

An antenna apparatus includes a substrate, antenna elements on the substrate, and surface wave filtering structures on the substrate. Each surface wave filtering structure is operable to decouple surface wave coupling between adjacent antenna elements of the antenna elements.

15 Claims, 14 Drawing Sheets

ULTRA WIDEBAND ISOLATION FOR COUPLING REDUCTION IN AN ANTENNA ARRAY

FIELD OF THE INVENTION

Embodiments of the present disclosure relate generally to wireless communication devices. More particularly, embodiments of the invention relate to ultra wideband isolation for coupling reduction in antenna arrays.

BACKGROUND

In recent years, wireless communication has been experiencing rapid advancements driven by demands from newer applications at every front of wireless technology, such as mobile communications (e.g., 5G and beyond), satellite communications, or Internet of Things (IoT). Different technologies have respective specific requirements, and based on a particular application, the demand may be for high speed and low latency, increased capacity, low power consumption and mass devices connection, and so on.

In the near future, there will be applications where a number of these technologies may come together in a single terminal to provide ubiquitous services among the various technologies. Also, in other application scenarios the demand may be for supporting the technologies globally across various geographic regions. For example, the prominent frequency bands in mmWave 5G communications globally range from 24 GHz all the way to 43.5 GHZ, although each region may only be operating in a limited part of this spectrum. Therefore, to cater the needs for such applications it will be desirable that the front end of the terminal supports a wide frequency bandwidth.

Moreover, those demands from the underlying applications place stringent requirement on device front-end and antenna designs. The antenna, which is probably the single most important component of a wireless communication system, acts as the interface between a terminal device, and the wireless communication medium or the wireless channel as it is often called. Apart from wider frequency bandwidth, the trend is also towards the antennas being agile in beam formation, thereby providing ways to electronically scanned arrays or phased arrays.

To one skilled in antenna design, it will be known that for an antenna to be able to cover a wide operating bandwidth (whether to cater multiple technologies, to cover multiple regional areas, or both), the antenna is required to have a larger electrical volume. For a planar antenna fabricated using conventional printed circuit board (PCB) technologies, the antenna needs to be supported on thicker dielectric material (also called substrate). However, at the same time, a thicker substrate supports surface waves which are detrimental to the antenna's performance. Surface waves in the dielectric material increase coupling between antenna elements of an antenna array, thereby incurring power loss in nearby antenna elements rather than contributing to direct radiation. This results in lower antenna efficiency and even scan blindness (meaning the antenna is not able to radiate in certain direction(s), and all power is lost in neighboring antenna elements).

In addition, wide beam scanning places further constraint on antenna element spacing for electronically steerable antennas (ESAs). Closer element spacing, which is required to avoid grating lobes in a scanned pattern (strong radiation in directions opposing the main lobe, often undesired), means even stronger coupling between neighboring elements through the surface waves.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
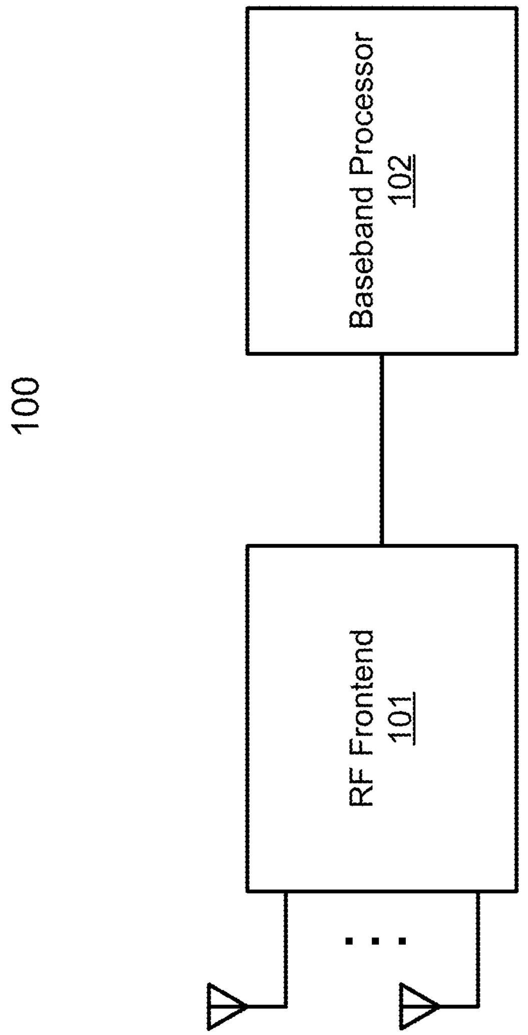
FIG. 1 is a block diagram illustrating an example of a wireless communication device according one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Note that in the corresponding drawings of the embodiments, signals are represented with lines. Some lines may be thicker or have a slash over the lines, to indicate more constituent signal paths, such as a differential signal, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a", "an", and "the" include plural references. The meaning of "in" includes "in" and "on".

As used herein, unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. The term "substantially" herein refers to being within 10% of the target.

Embodiments of the disclosure relate to an antenna or antenna apparatus designed to reduce surface wave coupling among tightly packed antenna elements in an antenna array. As described in more detail herein below, this can be achieved by use of surface wave filtering structures (e.g., frequency selective structures) around the antenna elements that act as surface wave mode filters to reduce surface wave interaction between adjacent antenna elements and improve element-to-element isolation over wideband spectrum. The reduction of surface wave coupling can also improve element patterns in the antenna array. As such, the embodiments of the disclosure described herein can play a positive and vital role in boosting and promoting the development of a new generation of wireless communication antenna systems where such antenna arrays are in demand.

According to a first aspect, an antenna apparatus includes a substrate, antenna elements on the substrate, and surface wave filtering structures on the substrate. Each surface wave filtering structure is operable to decouple surface wave coupling between adjacent antenna elements of the antenna elements.

In one embodiment, each surface wave filtering structure is disposed on a side of an antenna element or between a pair of antenna elements of the antenna elements.

In one embodiment, the antenna apparatus further includes a printed circuit board (PCB) comprising a coating of dielectric material forming the substrate.

In one embodiment, isolation between the adjacent antenna elements is at least 10 decibels (dB) in low-band spectrum and wideband spectrum.

In one embodiment, each antenna element is spaced from another antenna element based on a fraction of free space wavelength (e.g., ranging from about 0.3 to 0.6 free space wavelength).

In one embodiment, the antenna elements include wideband antenna elements.

According to a second aspect, a radio frequency (RF) transceiver includes an antenna including a substrate, antenna elements on the substrate, and surface wave filtering structures on the substrate. Each surface wave filtering structure is operable to decouple surface wave coupling between adjacent antenna elements of the plurality of antenna elements.

According to a third aspect, a radio frequency (RF) frontend circuit includes a digital signal processing unit, and a transceiver coupled to the digital signal processing unit to transmit and receive signals to and from the digital signal processing unit. The transceiver includes an antenna including a substrate, antenna elements on the substrate, and surface wave filtering structures on the substrate. Each surface wave filtering structure is operable to decouple surface wave coupling between adjacent antenna elements of the plurality of antenna elements.

FIG. 1 is a block diagram illustrating an example of a wireless communication device according one embodiment of the invention. Referring to FIG. 1, wireless communication device 100, also simply referred to as a wireless device, includes, amongst others, an RF frontend module 101 and a baseband processor 102. Wireless device 100 can be any kind of wireless communication devices such as, for example, mobile phones, laptops, tablets, hotspot devices, customer premises equipment (CPE), network appliance devices (e.g., Internet of thing or IoT appliance devices), etc.

In a radio receiver circuit, the RF frontend is a generic term for all the circuitry between the antenna up to and including the mixer stage. It consists of all the components in the receiver that process the signal at the original incoming radio frequency, before it is converted to a lower frequency, e.g., IF. A baseband processor is a device (a chip or part of a chip) in a network interface that manages all the radio functions (all functions that require an antenna).

In one embodiment, RF frontend module 101 includes one or more RF transceivers, where each of the RF transceivers transmits and receives RF signals within a particular frequency band (e.g., a particular range of frequencies such as non-overlapped frequency ranges) via one of a number of RF antennas. The RF frontend IC chip further includes an IQ generator and/or a frequency synthesizer coupled to the RF transceivers. The IQ generator or generation circuit generates and provides an LO signal to each of the RF transceivers to enable the RF transceiver to mix, modulate, and/or demodulate RF signals within a corresponding frequency band. The RF transceiver(s) and the IQ generation circuit may be integrated within a single IC chip as a single RF frontend IC chip or package.

Figure 2:
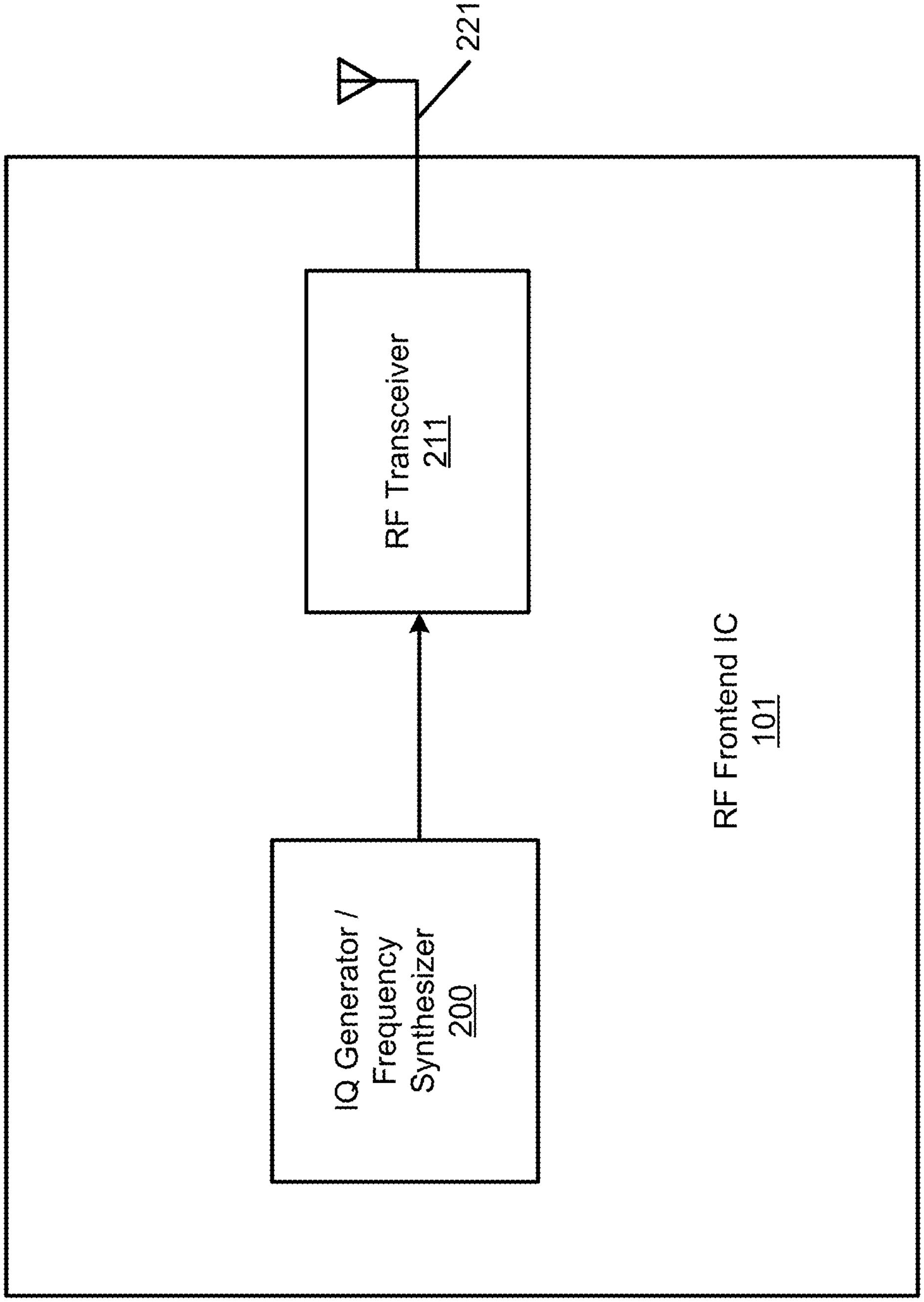
FIG. 2 is a block diagram illustrating an example of an RF frontend integrated circuit according to one embodiment.

FIG. 2 is a block diagram illustrating an example of an RF frontend integrated circuit (IC) according to one embodiment of the invention. Referring to FIG. 2, RF frontend IC 101 includes, amongst others, an IQ generator and/or frequency synthesizer 200 coupled to a RF transceiver 211. Transceiver 211 is configured to transmit and receive RF signals within one or more frequency bands or a broad range of RF frequencies via RF antenna 221. Although there is only one transceiver and antenna shown, multiple pairs of transceivers and antennas can be implemented, one for each frequency bands.

Figure 3:
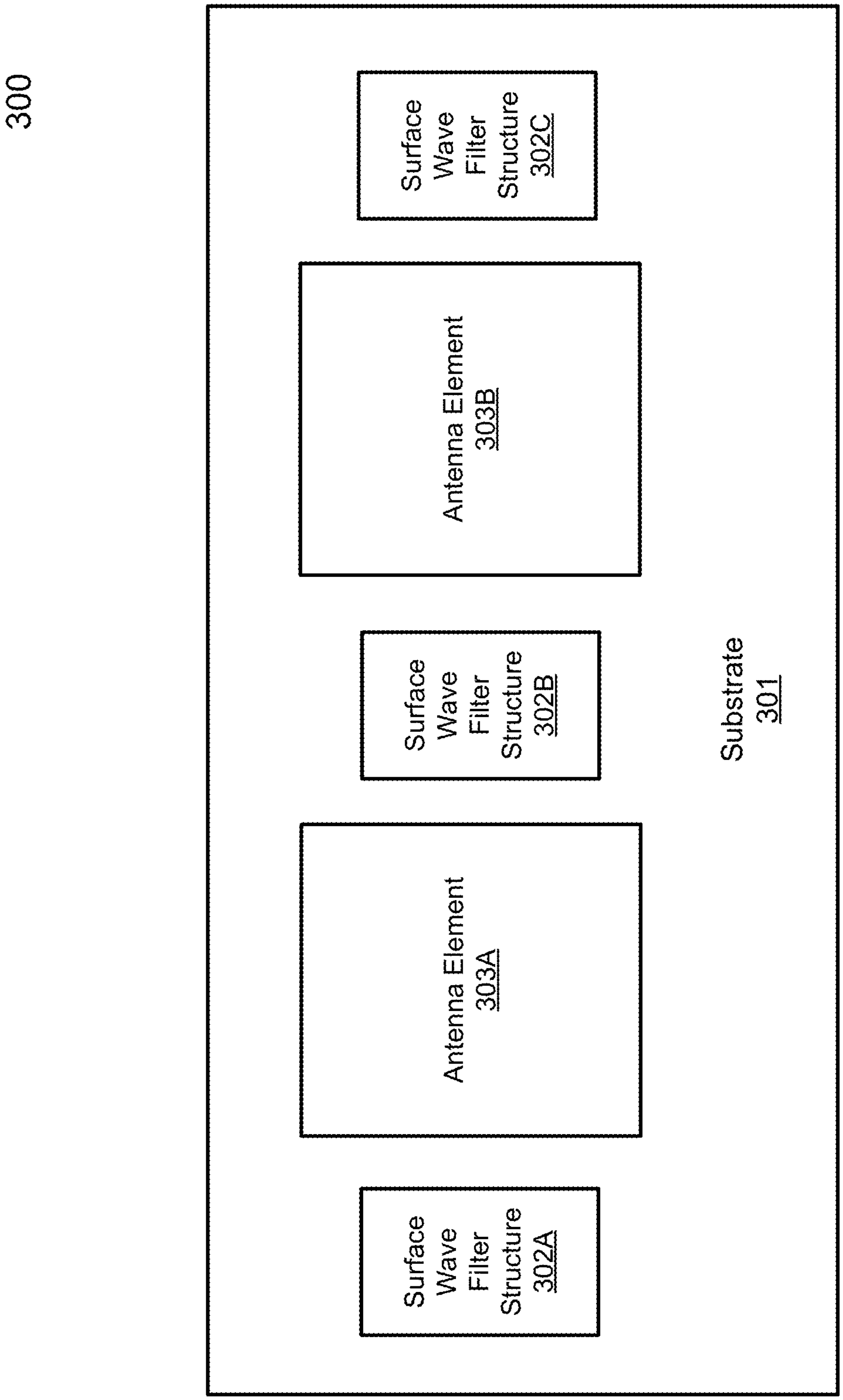
FIG. 3 is a block diagram illustrating an example of an antenna apparatus according to one embodiment.

FIG. 3 is a block diagram illustrating an example of an antenna (or radiating) apparatus according to one embodiment. In some embodiments, antenna apparatus 300 may be part of RF transceiver 211 of FIG. 2. Referring to FIG. 3, antenna apparatus 300 includes, but not limited to, substrate 301 (e.g., dielectric material layer), surface wave filtering structures 302A-C (e.g., frequency selective surface wave filtering structure), and antenna elements 303A-B (e.g., wideband antenna elements).

In an embodiment, substrate 301 may be part of a printed circuit board (PCB), not shown, or substrate 301 may be a layer or coating of the PCB. Surface wave filtering structures 302A-C and antenna elements 303A-B (which may collectively form an antenna element array) may be supported on substrate 301. In an embodiment, each surface wave filtering structure may be disposed around an antenna element (e.g., on a side of the antenna element), or in between two antenna elements, without being in direct contact with the antenna elements. Antenna elements 303A-B may be closely spaced (in terms of wavelengths in free space, e.g., speed of light divided by 5G frequency) to avoid, for example, grating lobes for wide angle scanning capability. The antenna element spacing can vary, for example, from about 0.3 wavelength at lower frequencies of a supported band to about 0.5 to 0.6 wavelength at a higher range of the supported band.

In an embodiment, surface wave filtering structures 302A-C are configured to reduce surface waves in substrate 301, thereby improving isolation between antenna elements 303A-B, particularly in a tightly packed configuration. The arrangement of surface wave filtering structures 302A-C also improves antenna radiation pattern properties of antenna elements 303A-B.

Figure 4:
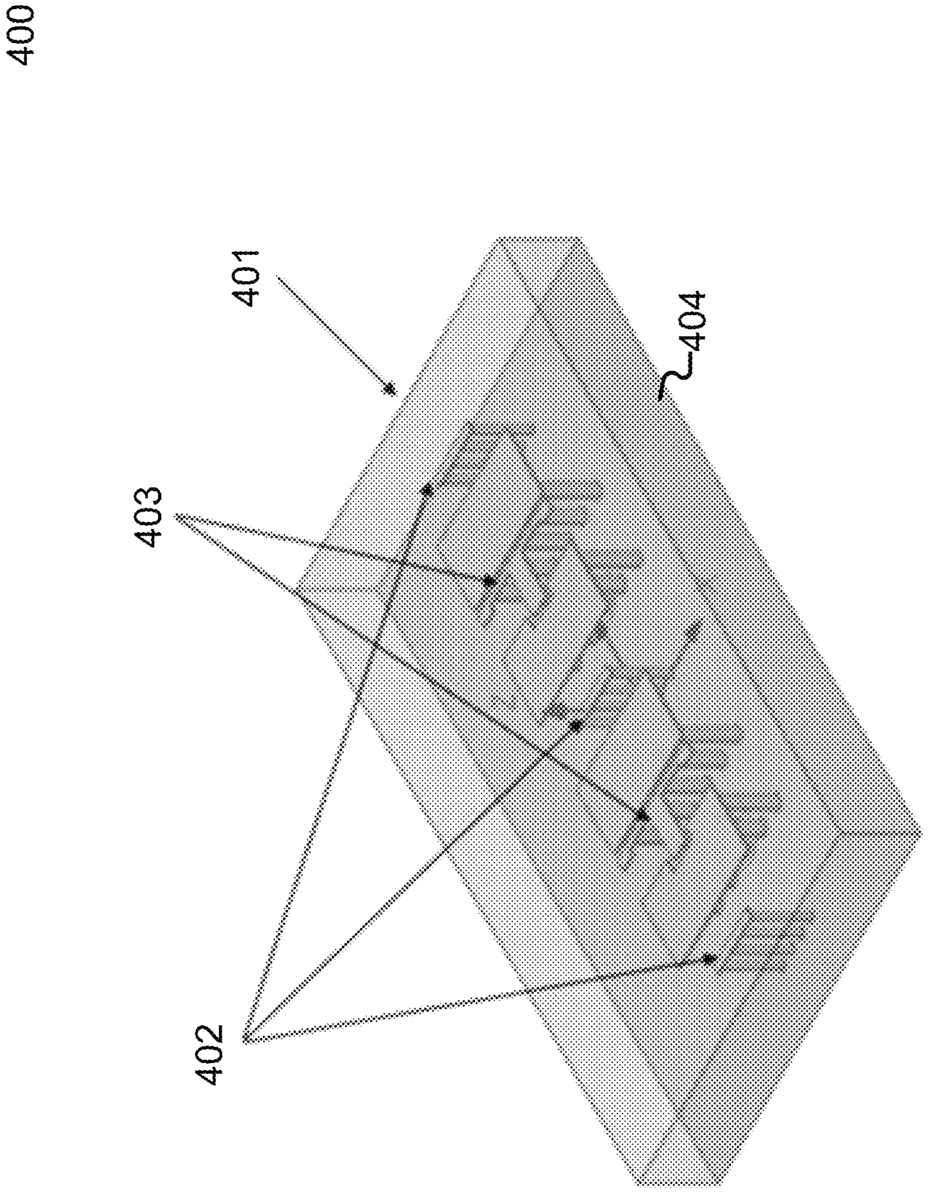
FIG. 4 is a block diagram illustrating another example of the antenna apparatus according to one embodiment.

FIG. 4 is a block diagram illustrating another example of the antenna apparatus according to one embodiment. In some embodiments, antenna apparatus 400 may be part of RF transceiver 211 of FIG. 2. In FIG. 4, antenna apparatus 400 includes, but not limited to, PCB 401 having surface wave filtering structures 402 and antenna elements 403 disposed on ground plane 404. PCB 401 may include a thick dielectric coating forming a substrate. As previously described, each surface wave filtering structure may be disposed around an antenna element (e.g., on a side of the antenna element), or in between two antenna elements to reduce surface waves in the substrate of PCB 401, thereby improving isolation between antenna elements 403.

Figure 5:
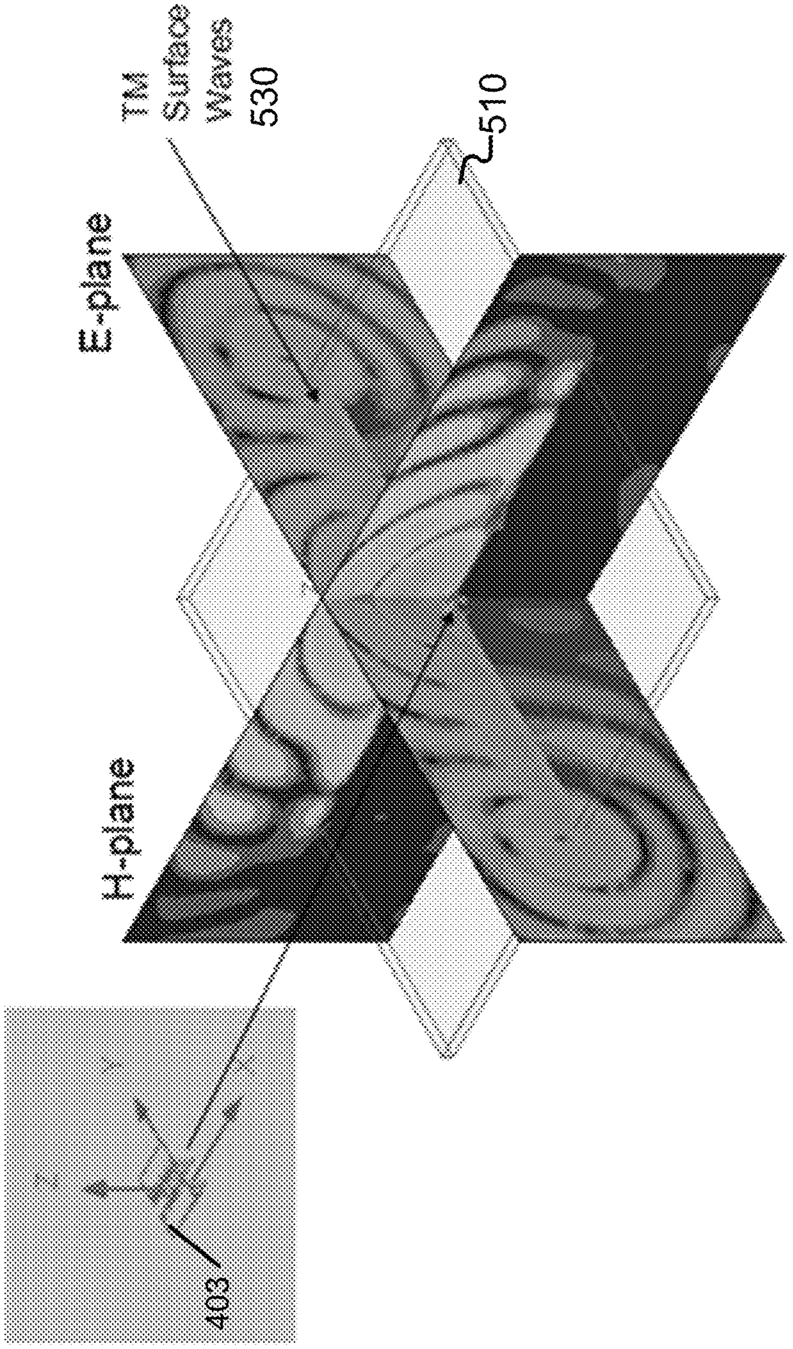
FIG. 5 is a block diagram illustrating reference planes of a wideband antenna element on a dielectric substrate of a printed circuit board, and surface wave excitation therein.

FIG. 5 is a block diagram illustrating reference planes of a wideband antenna element on a dielectric substrate. Referring to FIG. 5, a wideband antenna 403 on dielectric substrate 510 can cause strong surface waves 530 (e.g., transverse magnetic (TM) surface waves) to propagate in substrate 510 along the direction of the antenna element array (e.g., E-plane). As will be shown in FIG. 6, surface waves 530 trapped within substrate 510 would increase surface wave or E-field coupling between adjacent antenna elements.

Figure 6:
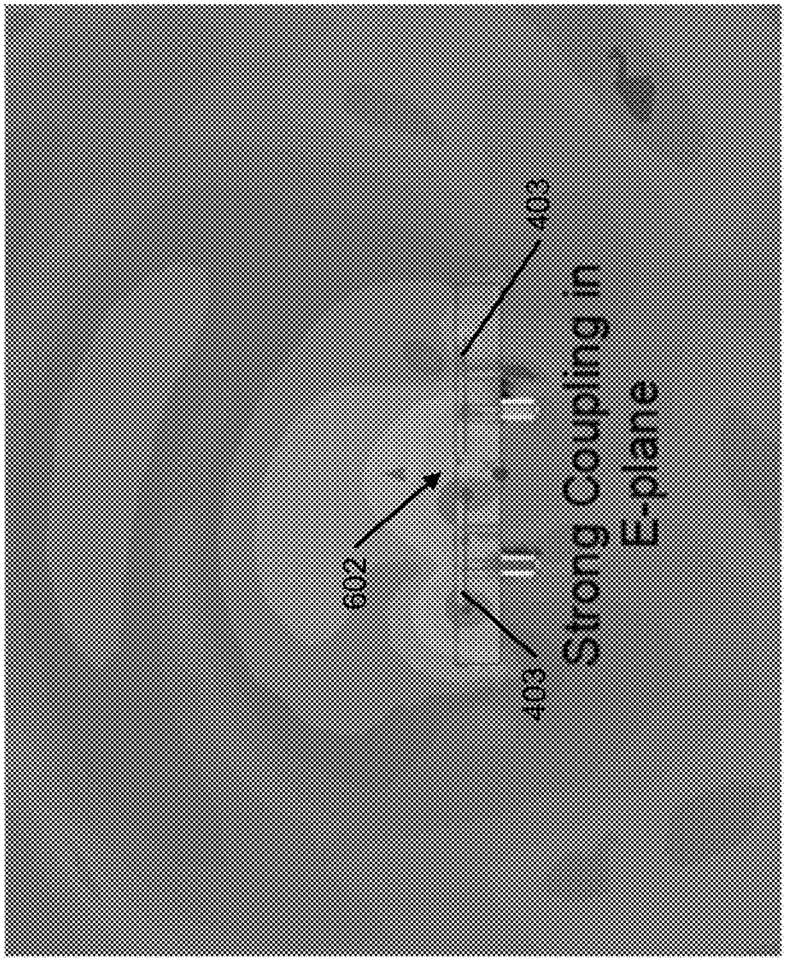
FIG. 6 is a diagram illustrating strong electrical coupling through surface waves between antenna elements.

FIG. 6 is a diagram illustrating surface wave coupling between antenna elements. Surface wave coupling between antenna elements 403 of an antenna array in the E-plane is primarily due to surface wave excitation in substrate 510 (as shown in FIG. 5). In FIG. 6, one antenna element 403 is excited while another antenna element 403 is terminated to system impedance. As can be seen in region 602, a significant portion of the excitation is coupled to the neighboring antenna element. This mutual coupling would become more clear if a transmission coefficient (also referred to as isolation) is examined between the two antenna elements 403.

Figure 7:
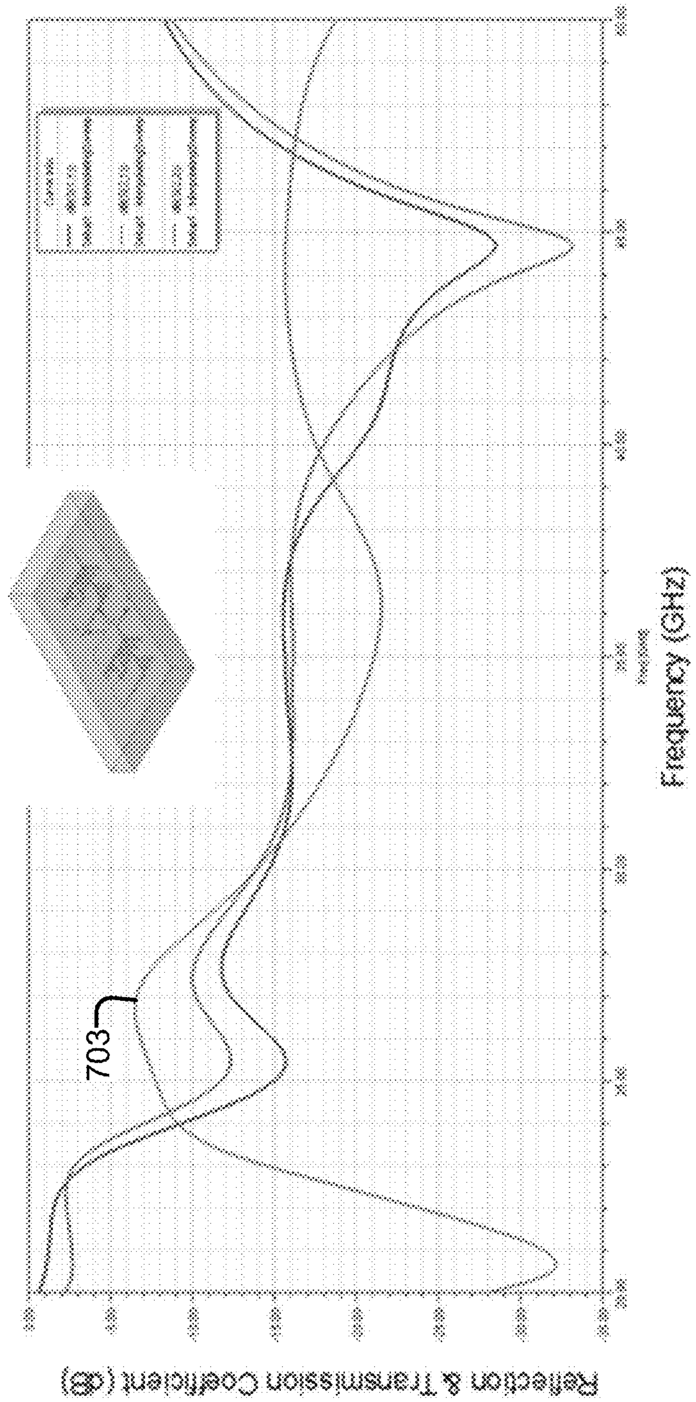
FIG. 7 illustrates isolation between two antenna elements.

Referring now to FIG. 7, which illustrates isolation between two antenna elements, the isolation between the two antenna elements 403 is about 5 dB in the low band spectrum, as illustrated by plot 703. To obtain sufficient radiation efficiency for the antenna elements, it is desired that the isolation to be about 10 dB or more among neighboring antenna elements over an operating band of the antenna array. Also, it is well known that such mutual coupling will cause active impedance variation in the antenna array, as the array is scanned away from a bore-sight direction and is often the cause of scan blindness in phased arrays.

Figure 8A:
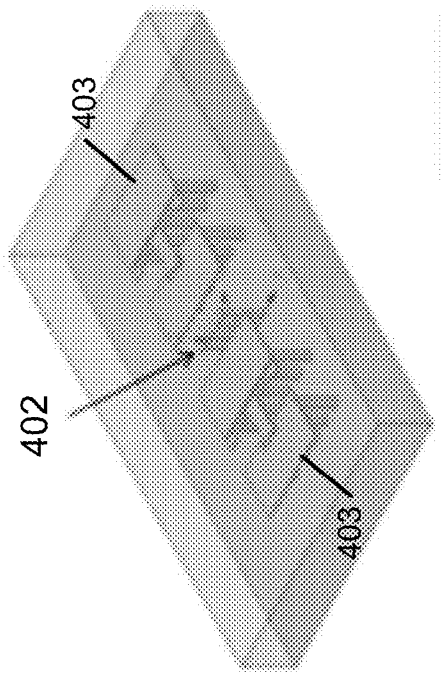
FIG. 8A is a diagram illustrating an example of an antenna apparatus having a surface wave filtering structure between two antenna elements according to one embodiment.
Figure 8B:
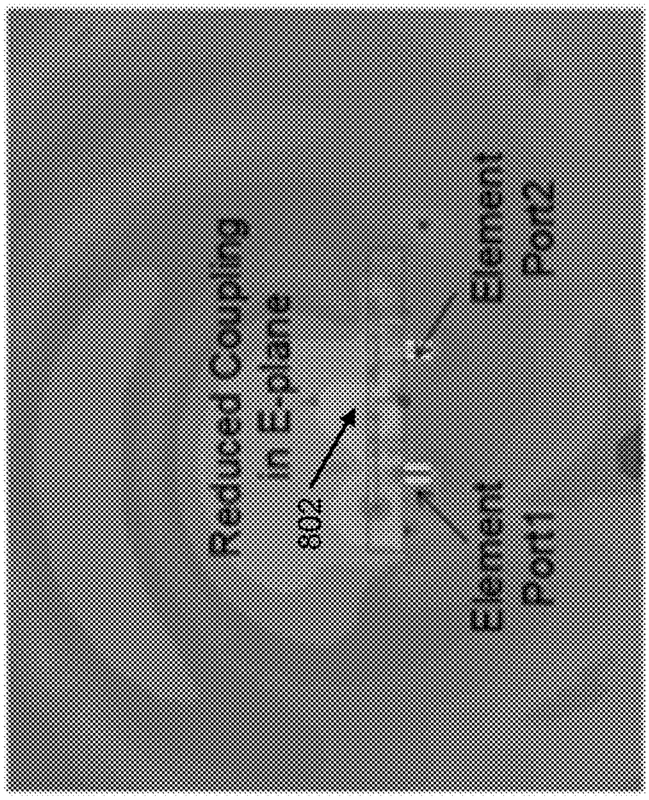
FIG. 8B is a diagram illustrating a reduced surface wave coupling between the two antenna elements of FIG. 8A according to one embodiment.

FIG. 8A is a diagram illustrating an example of an antenna apparatus having a surface wave filtering structure between two antenna elements according to one embodiment. In FIG. 8A, surface wave filtering structure 402 (which may also be referred to as isolation bar) is implemented between two adjacent antenna elements 403. Referring now to FIG. 8B, as shown in region 802, the application of structure 402 reduces the surface wave coupling between antenna elements 403. In this example, one antenna element 403 (labeled as Port1) is excited while the other antenna element 403 (labeled as Port2) is terminated to the system impedance. As can be seen in FIG. 8B, there is significantly less field interaction between the neighboring antenna elements 403 as compared to FIG. 6 (without the surface wave filtering structure 402 between the antenna elements 403). This mutual coupling reduction would become more clear when the transmission coefficient is examined in FIG. 9.

Figure 9:
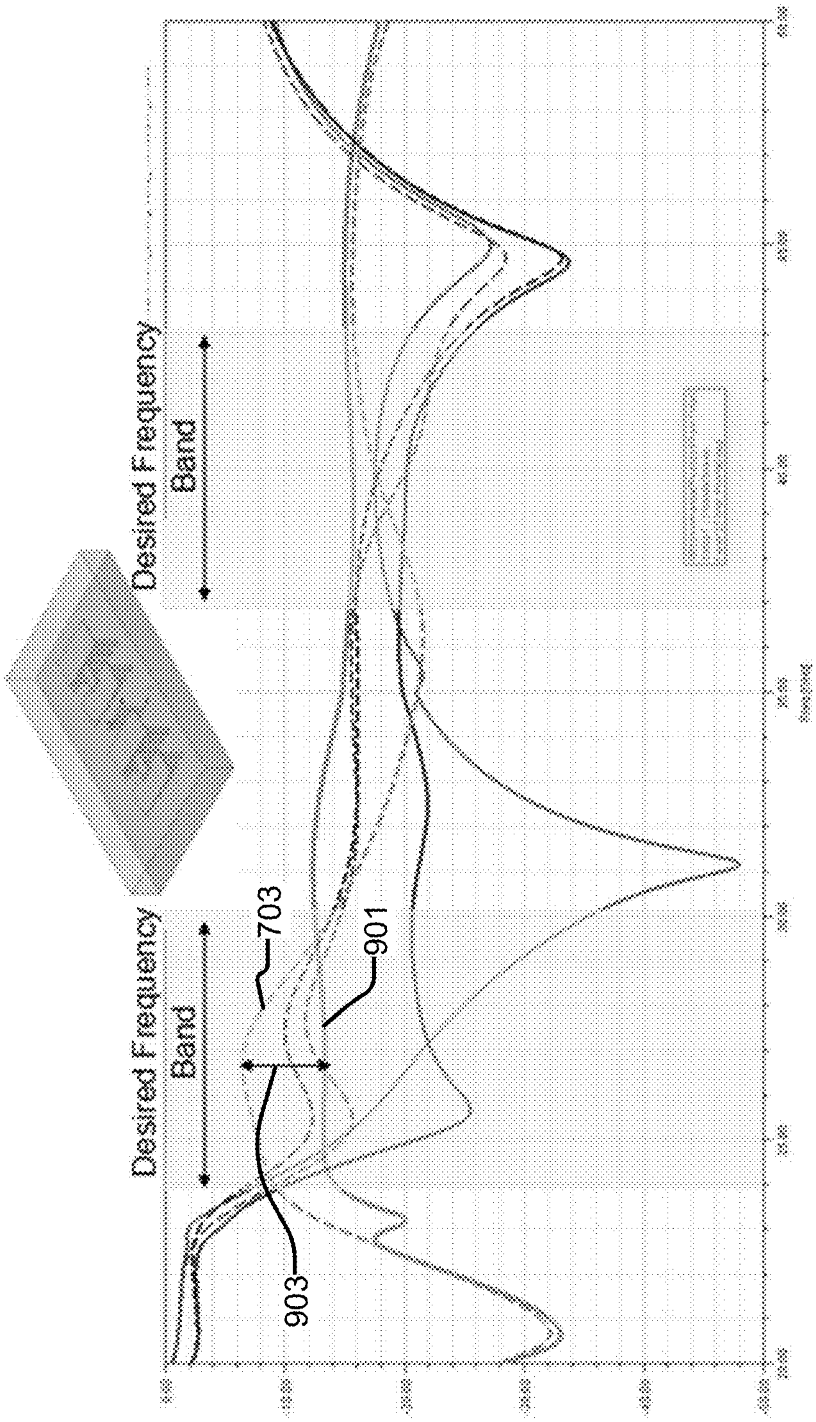
FIG. 9 illustrates improved isolation between antenna elements of the antenna apparatus of FIG. 8A.

Referring now to FIG. 9, which illustrates improved isolation between antenna elements of the antenna apparatus of FIG. 8A, with the application of the surface wave filtering structure 402, the isolation between the antenna elements 403 is improved by several decibels (by subtracting plot 703 of FIG. 7 from plot 901 to obtain isolation difference 903). In FIG. 9, the resulting isolation (plot 901) is below 10 dB mark over the entire frequency bands of interest (e.g., desired low-band and wideband spectrum). Also, it can be observed that the application of the surface wave filtering structure 402 helps with the impedance matching at the lower end of the frequency band, which is beneficial for the overall higher efficiency of the antenna apparatus.

Figure 10A:
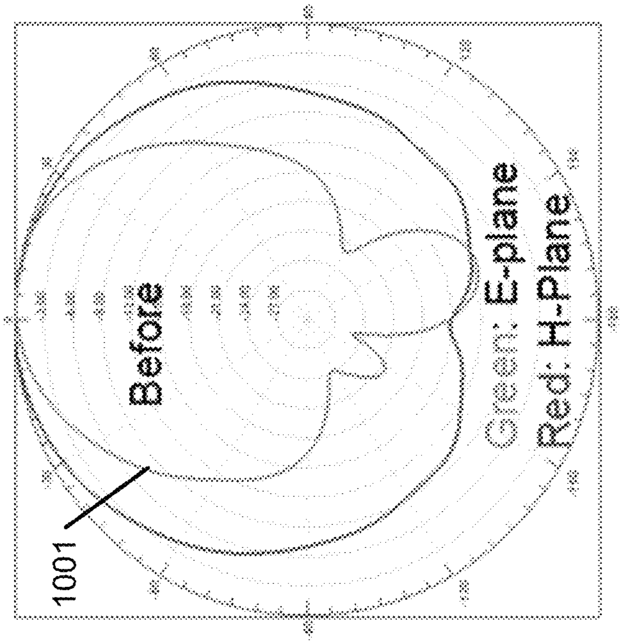
FIGS. 10A-10B illustrate the improvement in antenna element embedded pattern for the antenna apparatus of FIG. 8A.
Figure 10B:
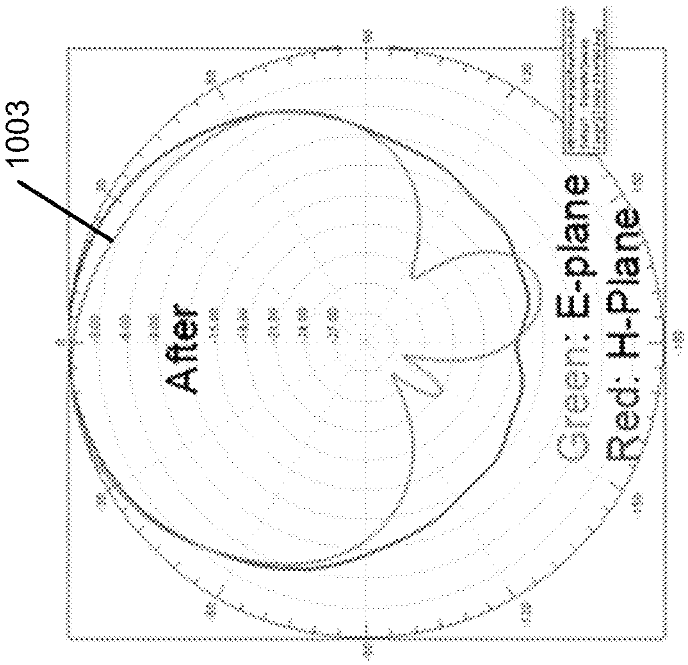

FIGS. 10A-10B illustrate the improvement in antenna element embedded pattern for the antenna apparatus of FIG. 8A. As can be seen in FIG. 10A, prior to the application of the surface wave filtering structure 402, the element beam width of the antenna element 403 in the E-plane is narrow (as indicated by element pattern 1001) due to the coupling between adjacent antenna elements 403. However, in FIG. 10B, with the application of the surface wave filtering structure 402, the coupling has been reduced thereby recovering a wide element beam width, which is desired for a wide-scanning antenna array (as indicated by element pattern 1003).

Figure 11A:
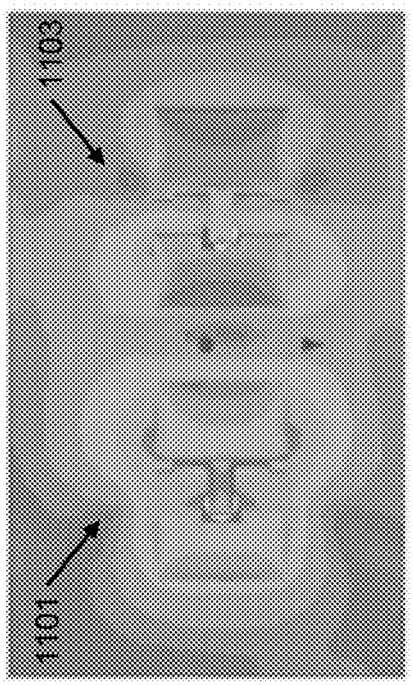
FIGS. 11A-11B illustrate the improvement in isolation through surface current magnitudes for the antenna apparatus of FIG. 8A.
Figure 11B:
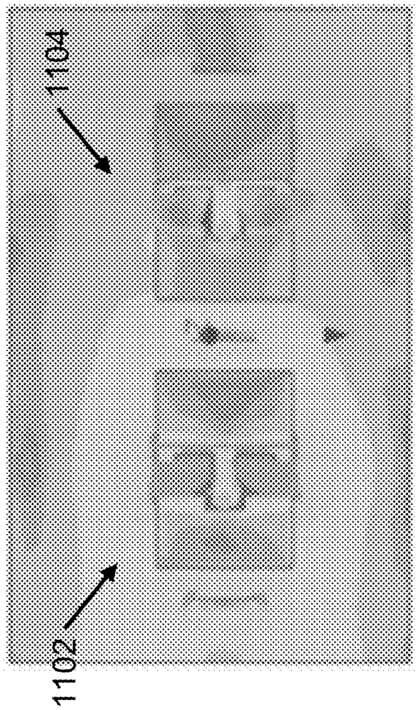

FIGS. 11A-11B illustrate the improvement in surface current magnitudes for the antenna apparatus of FIG. 8A. Referring first to FIG. 11A (which illustrates the surface current magnitude of the antenna apparatus without the surface wave filtering structure 402), the illustrated darker regions (e.g., regions 1101 and 1103) indicate that when one antenna port is excited, the other/adjacent port gets almost equal signal energy due to strong surface wave coupling in absence of the surface wave filtering structure. On the other hand, referring to FIG. 11B (which illustrates the surface current magnitude of the antenna apparatus with the surface wave filtering structure 402), as illustrated by bright region 1102 and dark region 1104, when one port is excited (bright region 1102) the other port receives much weaker signal energy coupled to it (emphasized by the darker region 1104 around port 2) due to improved isolation in the structure. Therefore, as can be seen in FIGS. 11A-11B, the application of the surface wave filtering structure 402 would reduce surface wave coupling between adjacent antenna elements. Also, when one element port is excited, the other port(s) would have relatively weak coupling. Accordingly, by implementing the surface wave filtering structure 402 with an antenna array, surface waves between antenna elements would be decoupled, thereby reducing wasted energy in nearby antenna elements.

Figure 12:
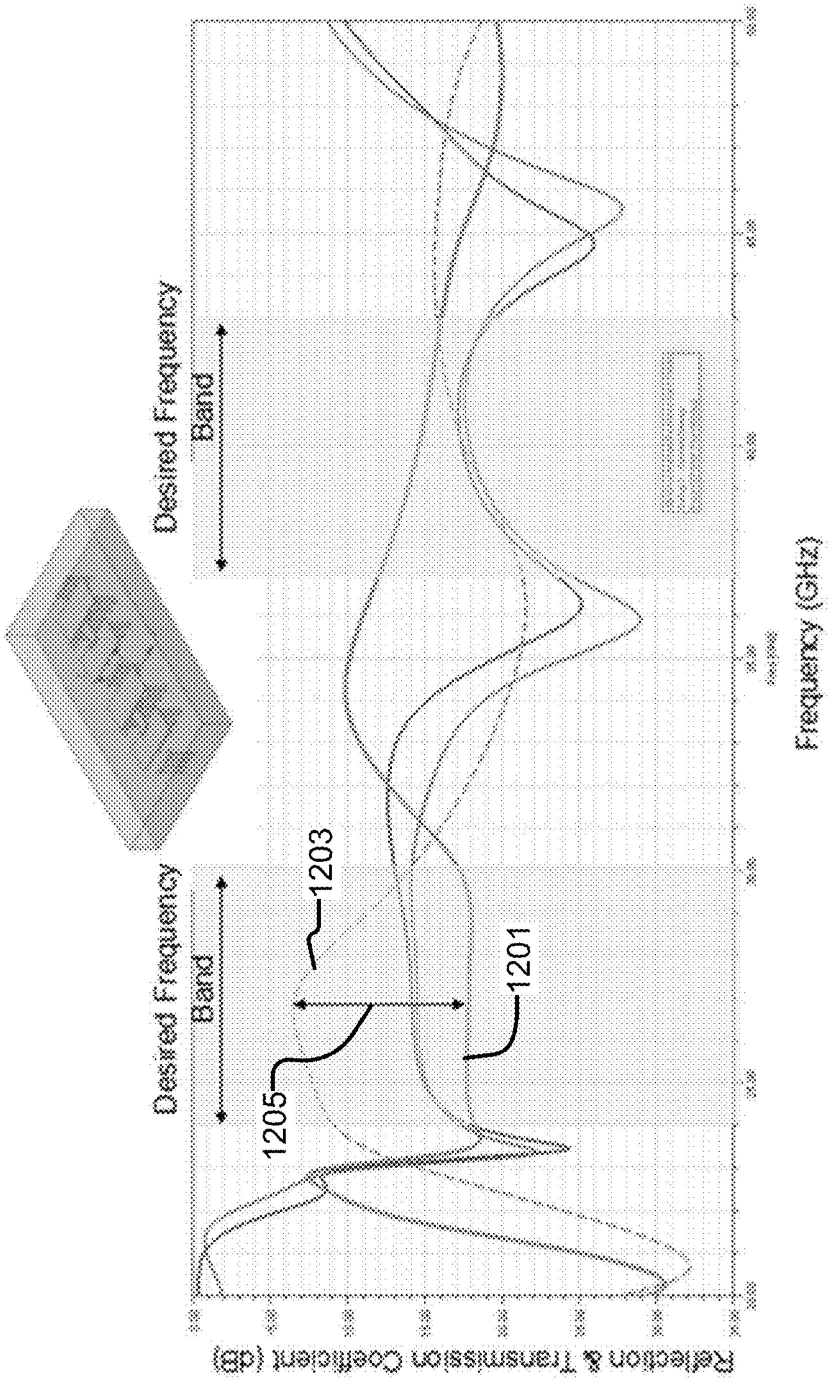
FIG. 12 illustrates improved isolation between antenna elements of the antenna apparatus of FIG. 4.

FIG. 12 illustrates improved isolation between antenna elements of the antenna apparatus of FIG. 4. In FIG. 12 (and as previously described), two surface wave filtering structures are respectively added to the sides of the antenna elements (in addition to a third surface wave filtering structure arranged in between the elements). This would further improve low band isolation (as indicated by isolation difference 1205) while maintaining a suitable isolation in wideband spectrum (as shown in plots 1201 and 1203). Accordingly, the use of surface wave filtering structures (as shown in FIG. 12) can be extended to operate seamlessly in a larger antenna array with a surface wave filtering structure disposed in between each pair of antenna elements.

Figure 13A:
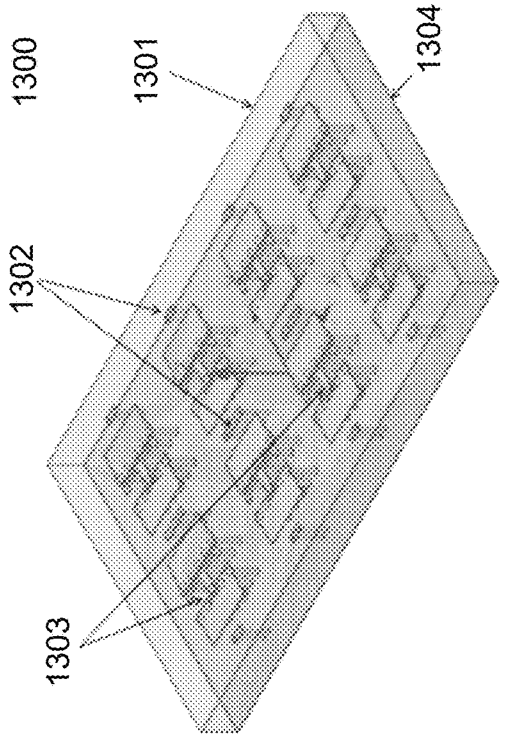
FIGS. 13A-13B are block diagrams illustrating yet another example of an antenna apparatus along with surface wave filter structures according to one embodiment.
Figure 13B:
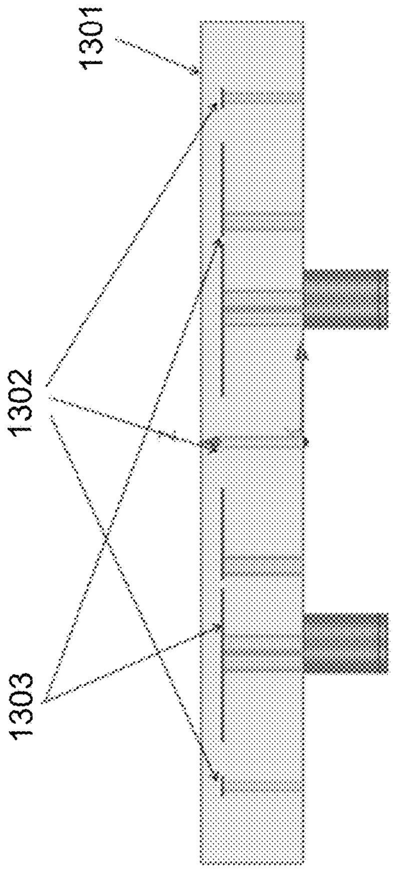

FIGS. 13A-13B are block diagrams illustrating yet another example of an antenna apparatus according to one embodiment. In some embodiments, antenna apparatus 1300 may be part of RF transceiver 211 of FIG. 2. In FIG. 13A (a perspective view of an antenna apparatus having a 2×4 element array which may be suitable for mobile platforms) and FIG. 13B (a side view of the antenna apparatus), antenna apparatus 1300 includes, but not limited to, PCB 1301 having surface wave filtering structures 1302 and antenna elements 1303 disposed on ground plane 1304. PCB 1301 may include a thick dielectric coating forming a substrate. With continued reference to FIGS. 13A-13B, each surface wave filtering structure 1302 may be disposed around an antenna element 1303 (e.g., on a side of the antenna element), or in between a pair of antenna elements to reduce surface waves in the substrate of PCB 1301. In an embodiment, the surface wave filtering structure 1302 is not in contact with the antenna element 1303. Thus, in the example shown in FIGS. 13A-13B, a total of twelve surface wave filtering structures 1302 are utilized in an 8-element antenna array, with four surface wave filtering structures 1302 being disposed in between four pairs of antenna elements 1303, respectively. Surface wave filtering structures 1302 may vary for the center and the sides in their exact form/size or geometry to accommodate for the electrical loading effect of the antenna elements 1303 and surface wave filtering structures 1302 on each other's frequency response.

Figure 14:
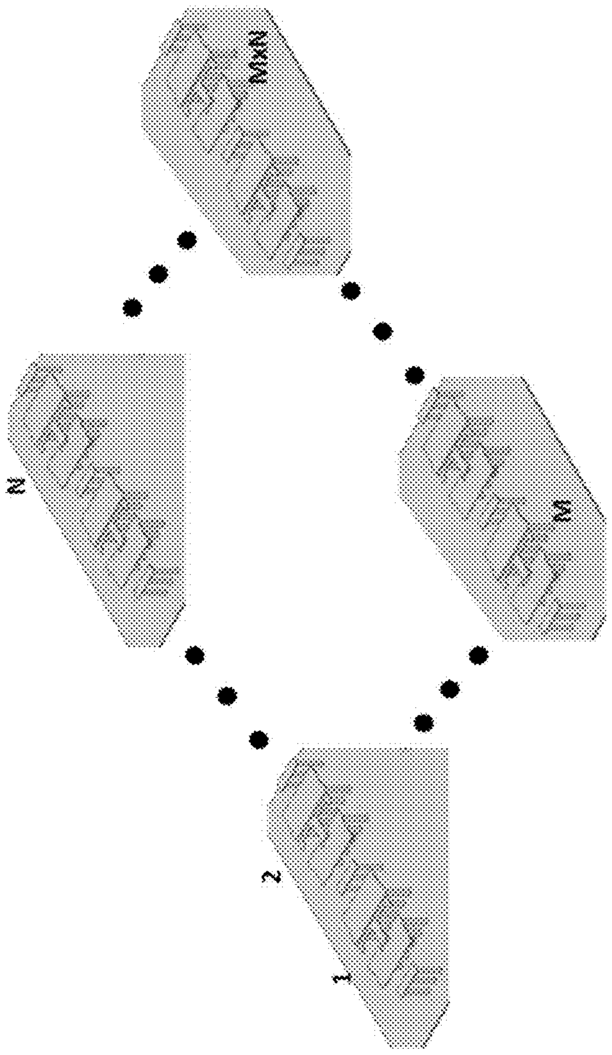
FIG. 14 is a block diagram illustrating an example of an expanded or scalable antenna apparatus according to one embodiment.

In a similar fashion, the example shown in FIGS. 13A-13B can be expanded to even a larger antenna array, such as an M×N antenna array (shown in FIG. 14) where M and N are positive integers.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An antenna apparatus, comprising:

a substrate;

a plurality of pairs of antenna elements on the substrate; and a plurality of sets of frequency selective surface wave filtering bars on the substrate, each set of frequency selective surface wave filtering bars operable to decouple surface wave coupling between a respective pair of antenna elements among the pairs of antenna elements;

wherein each set of frequency selective surface wave filtering bars includes a first frequency selective surface wave filtering bar disposed in parallel to a first side of a first antenna element of the respective pair of antenna elements, a second frequency selective surface wave filtering bar disposed in parallel to a first side of a second antenna element of the respective pair of antenna elements, and a third frequency selective surface wave filtering bar disposed in parallel to and in between the first antenna element and the second antenna element, wherein each of the first antenna element and the second antenna element has at least two sides without a frequency selective surface wave filtering bar disposed thereto;

each pair of antenna elements is aligned with other remaining pairs of antenna elements among the plurality of pairs of antenna elements;

the first frequency selective surface wave filtering bar of each set of frequency selective surface wave filtering bars is aligned with the first frequency selective surface wave filtering bars of other remaining sets of frequency selective surface wave filtering bars;

the second frequency selective surface wave filtering bar of each set of frequency selective surface wave filtering bars is aligned with the second frequency selective surface wave filtering bars of the other remaining sets of frequency selective surface wave filtering bars; and the third frequency selective surface wave filtering bar of each set of frequency selective surface wave filtering bars is aligned with the third frequency selective surface wave filtering bars of the other remaining sets of frequency selective surface wave filtering bars.

2. The antenna apparatus of claim 1, further comprising a printed circuit board (PCB) comprising a coating of dielectric material forming the substrate.

3. The antenna apparatus of claim 1, wherein isolation between the respective pair of antenna elements is at least 10 decibels (dB) in low-band spectrum and wideband spectrum.

4. The antenna apparatus of claim 1, wherein the first antenna element is spaced from the second antenna element based on a fraction of free space wavelength.

5. The antenna apparatus of claim 1, wherein the pairs of antenna elements comprise wideband antenna elements.

6. A radio frequency (RF) transceiver comprising:

an antenna comprising a substrate, a plurality of pairs of antenna elements on the substrate, and a plurality of sets of frequency selective surface wave filtering bars on the substrate;

wherein each set of frequency selective surface wave filtering bars operable to decouple surface wave coupling between a respective pair of antenna elements among the pairs of antenna elements;

each set of frequency selective surface wave filtering bars includes a first frequency selective surface wave filtering bar disposed in parallel to a first side of a first antenna element of the respective pair of antenna elements, a second frequency selective surface wave filtering bar disposed in parallel to a first side of a second antenna element of the respective pair of antenna elements, and a third frequency selective surface wave filtering bar disposed in parallel to and in between the first antenna element and the second antenna element, wherein each of the first antenna element and the second antenna element has at least two sides without a frequency selective surface wave filtering bar disposed thereto;

each pair of antenna elements is aligned with other remaining pairs of antenna elements among the plurality of pairs of antenna elements;

the first frequency selective surface wave filtering bar of each set of frequency selective surface wave filtering bars is aligned with the first frequency selective surface wave filtering bars of other remaining sets of frequency selective surface wave filtering bars;

the second frequency selective surface wave filtering bar of each set of frequency selective surface wave filtering bars is aligned with the second frequency selective surface wave filtering bars of the other remaining sets of frequency selective surface wave filtering bars; and the third frequency selective surface wave filtering bar of each set of frequency selective surface wave filtering bars is aligned with the third frequency selective surface wave filtering bars of the other remaining sets of frequency selective surface wave filtering bars.

7. The RF transceiver of claim 6, wherein the antenna further comprises a printed circuit board (PCB) comprising a coating of dielectric material forming the substrate.

8. The RF transceiver of claim 6, wherein isolation between the respective pair of antenna elements is at least 10 decibels (dB) in low-band spectrum and wideband spectrum.

9. The RF transceiver of claim 6, wherein the first antenna element is spaced from the second antenna element based on a free space wavelength.

10. The RF transceiver of claim 6, wherein the pairs of antenna elements comprise wideband antenna elements.

11. A radio frequency (RF) frontend circuit, comprising:

a digital signal processing unit; and a transceiver coupled to the digital signal processing unit to transmit and receive signals to and from the digital signal processing unit, the transceiver comprising:

an antenna comprising a substrate, a plurality of pairs of antenna elements on the substrate, and a plurality of sets of frequency selective surface wave filtering bars on the substrate, wherein each set of frequency selective surface wave filtering bars operable to decouple surface wave coupling between a respective pair of antenna elements among the pairs of antenna elements, each set of frequency selective surface wave filtering bars includes a first frequency selective surface wave filtering bar disposed in parallel to a first side of a first antenna element of the respective pair of antenna elements, a second frequency selective surface wave filtering bar disposed in parallel to a first side of a second antenna element of the respective pair of antenna elements, and a third frequency selective surface wave filtering bar disposed in parallel to and in between the first antenna element and the second antenna element, wherein each of the first antenna element and the second antenna element has at least two sides without a frequency selective surface wave filtering bar disposed thereto, each pair of antenna elements is aligned with other remaining pairs of antenna elements among the plurality of pairs of antenna elements, the first frequency selective surface wave filtering bar of each set of frequency selective surface wave filtering bars is aligned with the first frequency selective surface wave filtering bars of other remaining sets of frequency selective surface wave filtering bars, the second frequency selective surface wave filtering bar of each set of frequency selective surface wave filtering bars is aligned with the second frequency selective surface wave filtering bars of the other remaining sets of frequency selective surface wave filtering bars, and the third frequency selective surface wave filtering bar of each set of frequency selective surface wave filtering bars is aligned with the third frequency selective surface wave filtering bars of the other remaining sets of frequency selective surface wave filtering bars.

12. The RF frontend circuit of claim 11, wherein the antenna further comprises a printed circuit board (PCB) comprising a coating of dielectric material forming the substrate.

13. The RF frontend circuit of claim 11, wherein isolation between the respective pair of antenna elements is at least 10 decibels (dB) in low-band spectrum and wideband spectrum.

14. The RF frontend circuit of claim 11, wherein the first antenna element is spaced from the second antenna element based on a free space wavelength.

15. The RF frontend circuit of claim 11, wherein the pairs of antenna elements comprise wideband antenna elements.

* * * * *